United States Patent [19]

Flores

[11] 4,267,564
[45] May 12, 1981

[54] APPARATUS FOR CONTROLLING AND STOPPING A TRANSPORT MECHANISM AT A PREDETERMINED CUE POINT

[75] Inventor: Charles A. Flores, Fremont, Calif.

[73] Assignee: Ampex Corporation, Redwood City, Calif.

[21] Appl. No.: 37,262

[22] Filed: May 9, 1979

[51] Int. Cl.³ .................... G11B 15/48; G11B 19/06
[52] U.S. Cl. .................................. 360/72.3; 360/73; 360/74.1
[58] Field of Search .................. 360/72.3, 72.1, 74.1, 360/74.2, 73, 71; 242/186, 191, 207–210; 226/33, 38, 50, 143; 353/26; 318/603

[56] References Cited
U.S. PATENT DOCUMENTS

| | | | |
|---|---|---|---|
| 3,641,504 | 2/1972 | Sidline | 360/72.3 |
| 3,812,532 | 5/1974 | Crosser et al. | 360/72.3 |
| 4,062,048 | 12/1977 | Weber | 360/72.3 |
| 4,095,732 | 6/1978 | Merritt | 360/72.3 |
| 4,172,231 | 10/1979 | d'Alayer de Costemore d'Arc | 360/72.3 |

*Primary Examiner*—Alfred H. Eddleman

*Attorney, Agent, or Firm*—Robert G. Clay; George B. Almeida

[57] ABSTRACT

Apparatus is disclosed for issuing commands for controlling the operation of a transport mechanism preferably of the type which transports a recording medium such as a magnetic tape for the purpose of stopping at a predetermined cue point location on the medium. The apparatus includes a counter which accumulates tachometer pulses that are generated by movement of the medium so that the instantaneous count of the counter always provides an indication of the distance from the cue point location. Division rate outputs of the tachometer rate are provided by the counter and means responsive to various predetermined counts selects one of the division rate outputs for application to an error detector which measures the period of the division rate signal and provides an overspeed indication when the period exceeds a predetermined value. The determination of an overspeed condition results in a deceleration command signal being generated. As the medium approaches the cue point location, various predetermined counts effectively cause different division rate signals to be applied to the error detector so that the velocity of the medium is reduced in stepped increments as the cue point location is approached.

14 Claims, 8 Drawing Figures

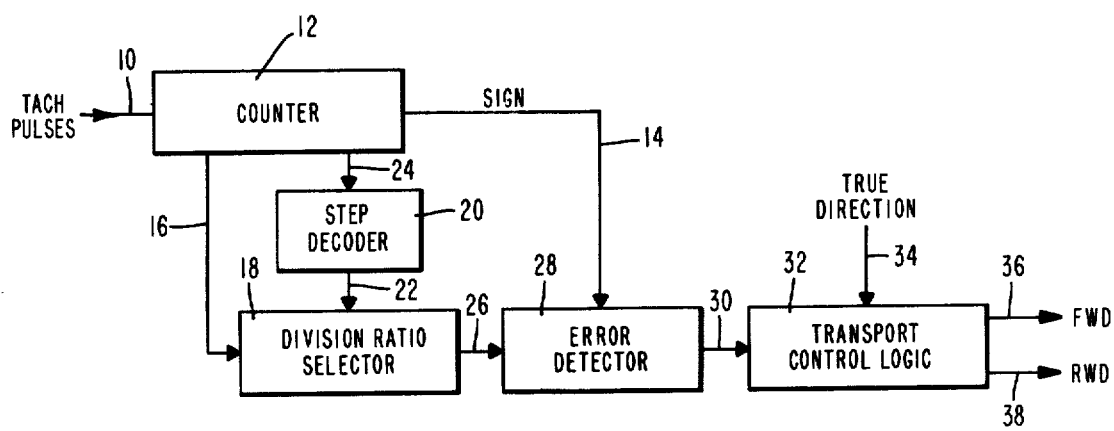
FIG_1
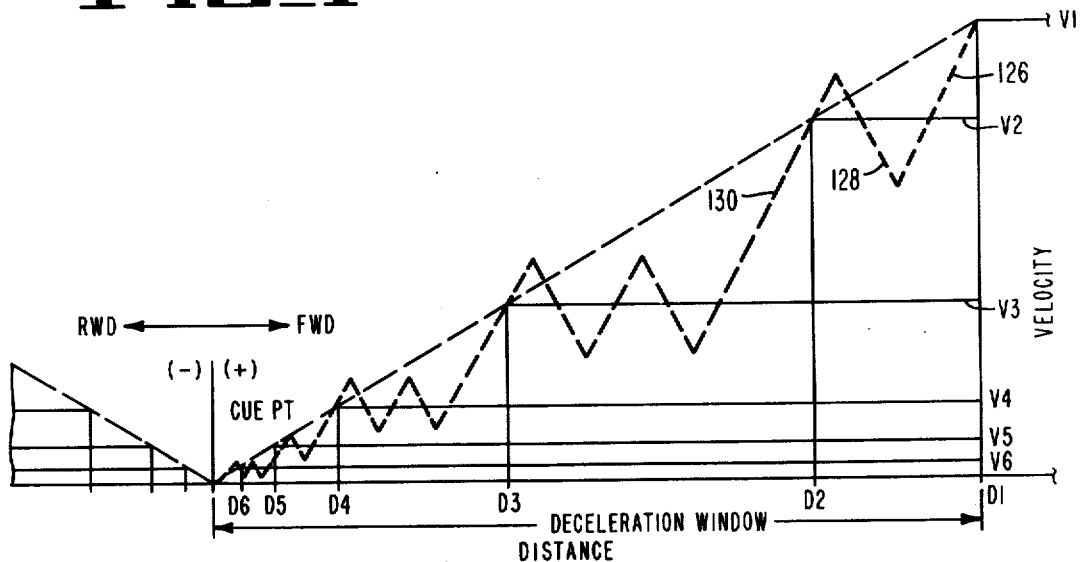
FIG_2
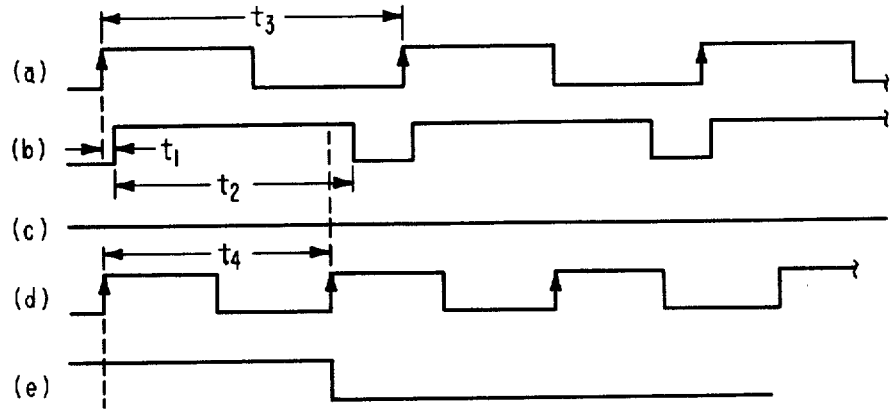
FIG_3

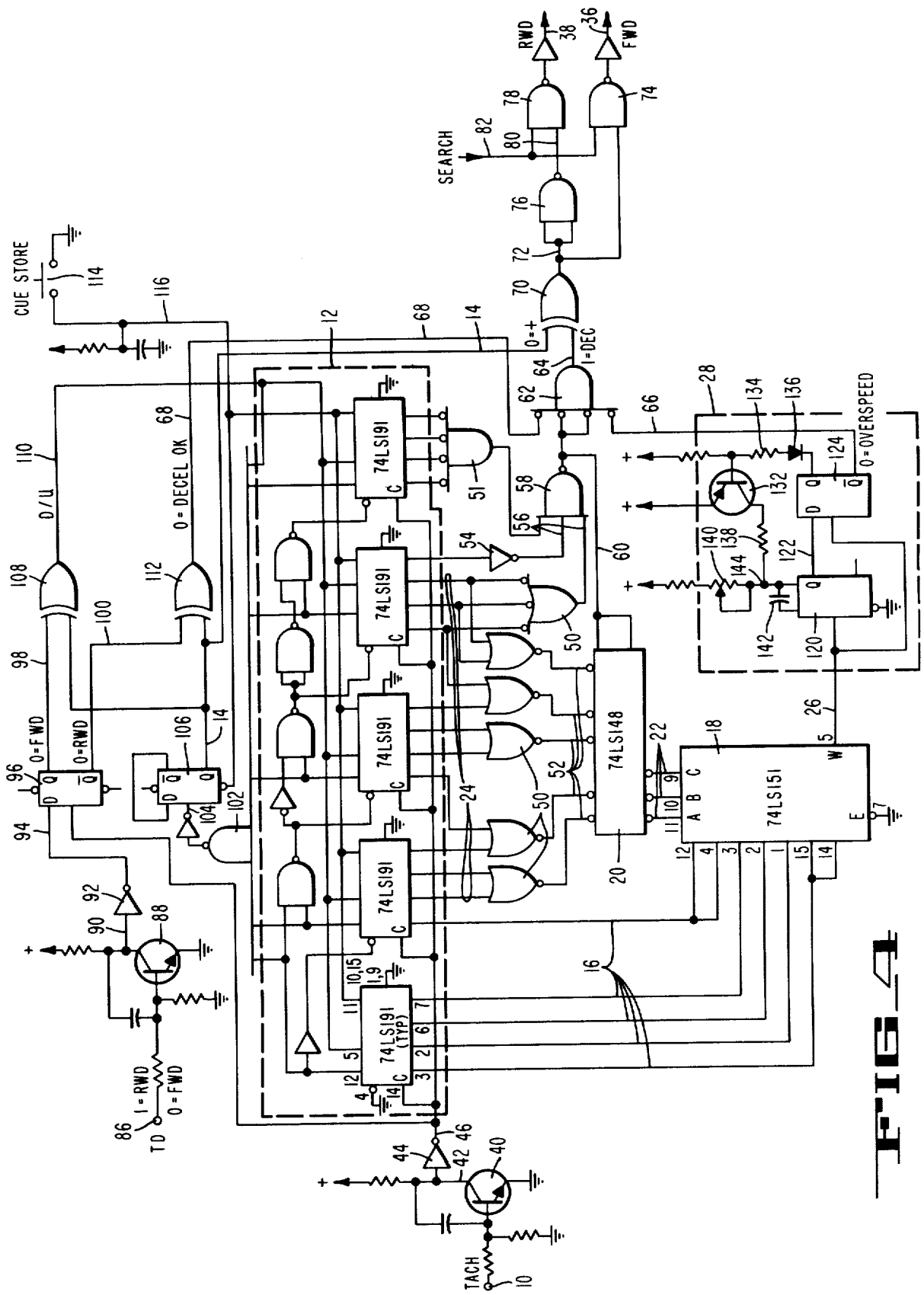
FIG._4

APPARATUS FOR CONTROLLING AND STOPPING A TRANSPORT MECHANISM AT A PREDETERMINED CUE POINT

The present invention generally relates to a record medium transport mechanism control apparatus, and more particularly to apparatus for controlling the transport mechanism to approach and stop at a predetermined cue point on the record medium.

There have been many types of control apparatus that have been designed to control record medium transport mechanisms for magnetic tape recorders in general, and video tape recorders in particular. Quite often, the transport mechanisms are extremely complex, particularly when they are designed for broadcast quality recording apparatus, because it is important that such apparatus be extremely reliable and accurate in its operation. It is often necessary for a video tape recorder operator to perform editing and other operations where he must return to a specific tape location which is often referred to as a cue point. Because tape speed during a fast forward or rewind operation can be quite fast, the transport mechanism must be decelerated as the tape approaches the cue point location during a search or return to the cue point operation. Some prior art designs have utilized circuitry which converts a digital signal that is indicative of the distance from the cue point to an analog signal and thereafter differentiates the analog signal to obtain the required velocity information which is in turn used to control the transport mechanism so that it will properly slow down and stop at the desired cue point. Other prior art designs have utilized tachometer pulses that are counted in a counter for a small predetermined interval and then have used the count obtained during the interval to provide an indication of velocity. Still other systems have required relatively complex circuitry, including phase comparators for comparing a reference signal from a reference pulse generator with a signal that is generated by a tachometer through various preselected division ratios. While such prior art designs have been generally effective, the cost of manufacturing many of the systems has been quite expensive, due in part to the large number of circuit components and circuit complexity.

Accordingly, it is an object of the present invention to provide an improved record medium transport mechanism control apparatus that is adapted to accurately control the transport mechanism to stop at a predetermined cue point which is reliable in its operation and which is less complex and expensive due to novel circuit design.

Another object of the present invention is to provide control apparatus of the foregoing type which effectively causes the transport mechanism to be decelerated in finite steps as the record medium approaches the cue point wherein the steps can be easily defined and adjusted, which permits it to be used with transport mechanisms having significantly different dynamic operating characteristics.

Yet another object of the present invention is to provide control apparatus of the foregoing type which utilizes tachometer pulses that are indicative of distance moved by the record medium together with a counter and other circuitry which, due to novel circuit design, requires no external reference frequency generator, phase comparators or the like to accomplish stepped deceleration of the transport mechanism as the cue point is approached.

Other objects and advantages will become apparent upon reading the following detailed description, while referring to the attached drawings, in which:

FIG. 1 is a block diagram of the apparatus embodying the present invention;

FIG. 2 is a graph illustrating the velocity versus distance deceleration characteristics that are produced by the apparatus embodying the present invention;

FIG. 3 including a-e illustrates waveforms of certain signals that are present during operation of the present invention; and, FIG. 4 is a detailed electrical schematic circuit diagram that can be used to carry out the operation of the block diagram of FIG. 1.

Turning now to the drawings, and particularly FIG. 1, there is shown a block diagram of the present invention which functionally illustrates an apparatus for controlling a transport mechanism such as may be used for transporting a magnetic tape in a magnetic tape recorder. The apparatus of the present invention effectively provides one of two command signals when it is activated, i.e., forward or rewind commands, which are applied to other transport mechanism control circuitry. The apparatus of the present invention effectively supplies these command signals to search and stop the transport at a preselected cue point. The apparatus also identifies the cue point which can virtually be at any location and the cue point can thereafter be returned to from either the forward or rewind directions as required. The forward and rewind commands can either be deceleration or acceleration commands depending on the true direction of movement of the record medium relative to the actual cue point location. In this regard, if a cue point is identified at a particular location, and the transport is operated in the forward tape direction for a time and it is thereafter desired to return to the cue point, the transport will be operated in the rewind direction, in which case a forward command signal will be a deceleration signal and a rewind signal will be an acceleration command signal. However, in the event the tape passes the cue point in the rewind direction and thereafter stops, a forward command signal will then be an acceleration command and a rewind command signal will effectively be a deceleration signal.

The apparatus of the present invention utilizes tachometer pulses from a conventional tachometer (not shown) which is operably associated with the magnetic tape so as to provide a tachometer pulse for each incremental distance the tape moves. Thus, it should be understood that the total number of pulses, if they were to be counted, would provide an accurate indication of the total distance moved relative to the starting point of the counting and if the true direction of movement is also known, then pulses received as the tape moves away from the cue point location would add to the count and pulses received as the tape moves toward the cue point location would be decremented from the accumulated count.

Broadly stated, the present invention receives the tachometer pulses and uses the pulses to increment a counter so that the apparatus thereby knows the total distance relative to the cue point location which, in the preferred embodiment, is at a zero count for reasons that will become evident. In response to a search request that the tape be returned to the cue point, it will be run in a direction to decrement the counter and will be operated at a maximum rewind or fast forward speed depending upon the direction of movement that is necessary to reach the cue point. The tape will be transported at the fast speed until it reaches a predetermined deceleration window which is a particular output count of the counter and the apparatus then provides decelerating commands to the transport mechanism and successively reduces the transport velocity as the zero count is approached and stops the transport at the zero count or cue point location. Since a tachometer pulse occurs for each predetermined incremental distance that the tape is moved, it should be apparent that the frequency of the tachometer pulses also provides velocity information and various outputs of the counter are used to determine whether the transport mechanism is in an overspeed or underspeed condition at all times within the deceleration window. In this regard, various counter outputs provide integral divisions of the tachometer pulse rate, and as the magnetic tape is moved toward the cue point and comes within the window, the highest division output is applied to an error detecting circuit to determine if it is in an overspeed condition. As the count approaches the cue point or zero count, a lesser division ratio output is applied to the error detector which thereby represents a lower velocity condition and an overspeed or underspeed determination is made at that time. By successively using lower division ratio outputs, keeping in mind that the tachometer pulse rate will be decreasing due to the transport mechanism being decelerated, the velocity will gradually decrease in successive steps until the zero count or cue point location is reached. One advantage of the apparatus is that the error detection circuitry is not complex and in fact comprises a means for measuring the period of the signal that is applied to it. Due to the nature of the division ratios coupled with the actual type speed, a single time duration can be used for all the velocity steps in the velocity versus distance profile.

More specifically, the tachometer pulses are applied to an input line 10 that clocks a counter 12 which must necessarily have a total count capacity that will handle the length of magnetic tape that is present on the magnetic tape recorder if the capability of returning to a cue point is desired from any location. The counter 12 has an output line 14 which merely provides an indication whether the cue point is one direction or another relative to the present location of the tape. In other words, if the line 14 is positive, that is an indication that the magnetic tape has been moved in the forward direction relative to the cue point. Similarly, a negative or low value on line 14 would provide an indication that the tape has been moved in the rewind direction and that it must be moved in the forward direction to return to the cue point. The counter 12 also has five outputs, indicated by the single line 16, which extend to a division ratio selector 18 that is controlled by a step decoder 20 via three lines 22 with the step decoder being controlled by a number of lines 24 that extend from the counter 12. When the division ratio selector 18 selects one of the outputs 16, it is applied via line 26 to an error detector 28 which provides an overspeed or underspeed signal on line 30. The line 30 extends to transport control logic circuitry 32 which also receives a true direction signal, i.e., whether the tape is actually in the forward or rewind direction on line 34, and this information is used to provide a forward command signal on line 36 or a rewind command signal on line 38.

In accordance with an important aspect of the present invention, the error detector 28 essentially comprises a monostable multivibrator or one-shot multivibrator that has an active output for a predetermined time and this time duration is used to measure the period of whatever division ratio signal that is applied to the error detector. The single predetermined time duration is used for all of the division ratio output because as the tape velocity decreases, the tachometer rate necessarily decreases but at the same time, the applied division ratio signal frequency is lower and, accordingly, the single time period measured can be used for each velocity level.

If a search command has been given to the apparatus shown in FIG. 1 to return the magnetic tape to the cue point from a location that is forward of the cue point, i.e., it must be rewound to return to the cue point, it will be moving at its normal rewind speed until it comes within a predetermined distance from the cue point, which is a finite count in the counter 12. Thus, referring to FIG. 2, which is a graph of the velocity versus distance during the operation of the transport mechanism controlled by the apparatus of the present invention, it may be moving at a velocity VI as shown in FIG. 2 until it reaches a distance D1 from the cue point. The D1 location is represented by a finite count on the counter and this causes the lines 24 to activate the step decoder 20 which will provide output signals on line 22 and cause the division ratio selector 18 to apply the highest division ratio frequency which is the tachometer pulse rate divided by 32 and this rate will appear on line 26 to the error detector which measures the duration of the period of the signals.

Once the tape is within the deceleration window, the error detector will detect an overspeed condition and will provide a signal on line 30 that results in a forward command signal being issued on line 36 which will comprise a deceleration command. The velocity will then decrease until it reaches the step identified as V2 which is shown to be lower than V1. As the tape continues to approach the cue point at the lesser velocity V2 it will reach a distance D2 from the cue point whereupon the step decoder will cause the division ratio selector 18 to apply a lesser division ratio signal, i.e., the tachometer rate divided by 16, which will be applied to the error detector 28 which taken makes an overspeed or underspeed determination for a velocity V3. Since the transport will have been decelerated to the V2 velocity, it will again issue a forward command signal on line 36 for further decelerating the tape. Similarly, when the tape reaches the closer distance D3 from the cue point, a divided by 8 division ratio output signal will be applied to the error detector so that slower velocity V4 will be the standard against which an overspeed or underspeed condition is to be determined. In a similar manner, D4, D5 and D6 represent successively closer distances for which correspondingly slower velocity V5, V6 and the zero velocity level are approached. It can be easily seen that the velocity profile is systematically reduced as the cue point is approached so as to provide a deceleration characteristic that will result in the tape being stopped at the proper cue point. It should also be understood that the distance levels D1 through D6, as well as the cue point, are actually predetermined count values of the counter and these count values can be chosen as well as changed to provide the desired velocity profile that is compatible with the operating characteristics of the particular transport with which the apparatus of the present invention is being used. To define a cue point location, it is necessary only to reset the counter to zero by a single command to the counter, preferably responsive to a switch actuation by an operator and the cue point will thereafter be known. It should be understood that there need be no signal recorded on the record medium as is required in some prior art systems.

Turning now to the specific circuitry that can be used to carry out the operation of the block diagram shown in FIG. 1 and referring particularly to FIG. 4, the tachometer pulses are applied at the leftward input line 10 and are used to control a transistor 40 which has its collector connected to line 42 which in turn is connected to an inverter 44 that has an output line 46 that clocks the counter 12 shown within the dotted lines. The counter 12 actually comprises a chain of five 4-bit counters which are interconnected in a conventional manner. There are five output lines 16 extending from the counter 12 to the division ratio selector 18 which is a one of five selector integrated circuit that is controlled by control lines 22. These lines are output lines of the step decoder 20 which is a standard priority encoder integrated circuit that is controlled by lines 24 via logic gates 50 and lines 52, as shown. The lines 24 merely represent decoded outputs for particular desired counts of the counter which are applied to the step decoder 20 which in turn controls the selector 18 so as to apply the signals of one of the lines 16 onto output line 26 that extends to the error detector 28 shown within the illustrated dotted lines. The five output lines 16 carry signals that represent integral divisions of the tachometer pulse rate and specifically carry the tachometer pulse rate divided by 2, 4, 8, 16 and 32. As the transport mechanism moves the magnetic tape into the deceleration window, the tachometer rate divided by 32 output is initially applied to the error detector 28 and at each stepped distance D2, D3, D4, D5 and D6, the lesser division ratio output signals are applied to the error detector.

When the tape initially enters the deceleration window where it is a distance D1 from the cue point, the counter count corresponding to this distance is decoded by logic gates 50, 51, and an inverter 54. Lines 56 extend from the gates and the inverter and provide inputs to a gate 58 which generates a true low output signal on line 60 which enables the step decoder 20. When the counter contains an accumulated count greater than the count corresponding to the distance D1, the line 60 is high which disables the step decoder 20 and thereby disables the division ratio selector. Line 60 also extends to one input of a gate 62 which has an output line 64 which supplies a deceleration command if it is high. This occurs if an overspeed condition is detected by the error detector 28 via input line 66, together with the counter being within the deceleration window and an input line 68 being low which is an indication that it is all right to decelerate due to other conditions being satisfied which will be hereinafter described. If a deceleration signal is provided on line 64, it effectively inverts the signal on line 14 by an exclusive OR gate 70 and the output appears on line 72 which is directly applied to a NAND gate 74 and is inverted by gate 76 before being applied to a second NAND gate 78 via line 80. If the operator had previously initiated a search or return to the cue point command, line 82 will be active and gates 74 and 78 will be enabled so that either a decelerate or accelerate signal will be generated.

In accordance with an important aspect of the present invention, the sign signal provided on line 14 effectively provides a signal that is indicative of whether the tape has been moved forwardly relative to the cue point or in the rewind direction thereof. This signal is obtained from logic circuitry shown in the upper portion of FIG. 4 which utilizes a true direction signal on line 86 that is supplied by conventional circuitry (not shown) and which provides a low level signal when the transport is moving the tape is the forward direction and a high level when it is moving in the rewind direction. This signal is applied to a transistor 88, the collector of which is connected by line 90 to an inverter 92 having output line 94 which extends to the D input of a flip-flop 96 and which is high when it is moving in the rewind direction and low when it is moving in the forward direction. Tachometer pulses result in line 46 clocking the flip-flop 96 and provide a low level on line 98 when it is moving in the forward direction and similarly a low level on line 100 when it is moving in the rewind direction. The counter 12 has output line which provide inputs to a NAND gate 102 and an inverter, the output 104 of which clocks another D flip-flop 106 which effectively generates the sign signal. If the flip-flop 106 has a low level on output line 14, it is an indication that the tape is to the right or forward of the cue point and if it is left of the cue point, it will have the opposite level. Line 14 also extends to an exclusive OR gate 108, the other input of which is supplied by line 98 and its output line 110 provides an up or down count indication that controls the counter 12 so that it will be either incremented or decremented in response to the tachometer pulses. Line 14 together with line 100 are applied to exclusive OR gate 112 which has output line 68 which provides a signal indicating that it is proper to decelerate when the tape is being transported in the true rewind direction and the tape is forward relative to the cue point, as well as when it is being transported in the forward direction and it is to the left of the cue point.

To identify the cue point, it is only necessary to set the counter to its zero count which is accomplished by the operator actuating switch 114 which grounds line 116 that extends to the counter 12 and resets the same.

In accordance with an important aspect of the present invention and referring to the error detector 28 shown in FIG. 4, it comprises a monostable multivibrator or one-shot multivibrator 120 that is triggered by the line 26 from the division ratio selector. The Q output of the multivibrator 120 is connected by line 122 to the D input of a D flip-flop 124 which is also clocked by line 26. The $\overline{Q}$ output of the flip-flop 124 is connected to line 66 and provides the overspeed indication when it is at a low level. As previously mentioned, the error detector 28 effectively measures the period of the pulses that are present on line 26. This can be best understood by referring to the waveform shown in FIG. 3 which shows a representative division ratio signal in FIG. 3a. The one-shot multivibrator 120 is triggered by a positive-going transition and provides an output on line 122 that is illustrated by the waveform of FIG. 3b. It is noted that there is a slight inherent delay tl between the positive-going transition of the Q output going high which is exaggerated for the purposes of this description. The predetermined tme t2 of the high output on line 122 is a function of the RC time constant of the multivibrator 120. The flip-flop 124, by virtue of being clocked by the same transition that triggers the multivibrator 120, effectively clocks the level on line 122 at the instant of the positive transition which, as shown by the relationship of FIGS. 3a and 3b, is a low level so that the Q and $\overline{Q}$ outputs are low and high, respectively, until the period of the input signal on line 26, i.e., the period t3, decreases so that the positive transition occurs during the time the high level is present on line 122. This is shown in FIG. 3d which illustrates a signal on line 26 that has a shorter period t4 than the time period t2 so that at the occurrence of the second consecutive positive-going transition, the Q output will be high on line 122, which will result in a high being clocked into the D input of the flip-flop 124 which will cause the $\overline{Q}$ output line 66 to go low which indicates an overspeed condition. This will result in a decelerating command being issued to the transport, i.e., the forward line 36 having an active signal and the transport mechanism will be decelerated, if desired.

It should be appreciated that the transport will not actually instantaneously decelerate to the velocity step V2 shown in FIG. 2, but will gradually decelerate at some specific rate, such as by the slope illustrated by the dotted line 126. When the velocity does fall below the level V2, than an acceleration command will be generated since the level on line 66 will change to high due to the period t3 of the signal on line 26 exceeding the period t2 of the multivibrator 120. The acceleration is shown by the line segment 128 in the graph. When the velocity again exceeds the level V2, it will be detected by the error detector which will again provide an overspeed indicating signal on line 66 which will result in a deceleration command again being issued which is illustrated by the decelerating line segment 130. However, by virtue of the tape reaching the distance D2 from the cue point, another division ratio signal is selected which is a longer period signal by virtue of a lesser division ratio and this longer period signal is applied on line 26 which is detected by the error detector 28 and results in an overspeed signal on line 66, in the same manner as previously described.

If a single RC time constant were used with the multivibrator 120, a velocity profile that would have characteristics close to the stepped profile shown in FIG. 2 may result due to the fact that as soon as the velocity dropped below each step level, e.g., velocity segment 126 dropping below level V2, there would be an acceleration command generated, and deceleration and acceleration commands would alternately occur relatively quickly, producing an undesirable hunting action. The velocity profile shown in the dotted representation in FIG. 2 represents a more desirable operation of the transport mechanism because there is no significant amount of undesirable hunting and this is accomplished by providing a degree of histeresis in the operation of the one-shot multivibrator 120. This is done by effectively increasing the RC time constant that controls the time period of the multivibrator once an overspeed condition is initially detected. To accomplish this increase, the Q output of the flip-flop 124 is connected to the base of a transistor 132 via resistor 134 and diode 136. The collector of transistor 132 is connected to a resistor 138 which is connected to a second resistor 140 and a capacitor 142 by line 144. When an overspeed condition has not been detected, the Q output of flip-flop 124 is normally low which results in the transistor 132 being in conduction. With transistor 132 conducting, positive voltage is applied to resistor 138 and resistors 138 and 140 are effectively in parallel which provides a resistive value which together with the value of the capacitor 142 defines a RC time constant for the multivibrator 120. However, when an overspeed condition is detected, the Q output of flip-flop 124 will be switched high which results in transistor 132 being switched off and resistor 138 is effectively removed from the circuit and the resistor 140 together with the value of the capacitor 142 provides the RC time constant for the multivibrator. The resistive value of the resistor 140 will necessarily be larger than the effective resistive value of the two parallel connected resistors 138 and 140. The values of the resistors 138 and 140, and the capacitor 142, are preferably determined such that the time constant increases approximately 40% to 50% after the overspeed condition has been detected. This will produce a velocity versus distance profile generally as shown in FIG. 2 wherein the line segment 126 representing the actual velocity decreases approximately 40% to 50% beyond the stepped levels before an acceleration command is generated.

From the foregoing description it should be appreciated that an improved apparatus for controlling a transport mechanism to return a record medium to a cue point has been described which has many desirable attributes and advantages. Among the advantages is the relative simplicity of the circuit design which contributes to its reliable operation and lower initial manufacturing costs. Moreover, this advantage is achieved without any sacrifice in operational capability and, in fact, the unique design permits the apparatus to be used with many differing transport mechanisms because the velocity levels and count outputs can be easily changed to accommodate the dynamic operating characteristics of the particular transport mechanisms.

It should be understood that although preferred embodiments of the present invention have been illustrated and described, various modifications thereof will become apparent to those skilled in the art, and accordingly, the scope of the present invention should be defined only by the appended claims and equivalents thereof.

Various features of the invention are set forth in the following claims.

What is claimed is:

1. Apparatus for controlling a medium transport mechanism for stopping the medium at a predetermined cue location, comprising:

tachometer means for providing an electrical pulse for each predetermined incremental distance moved by said medium;

means for counting said pulses, the difference between the accumulated count and the count corresponding to said cue point location providing a measurement of the distance to the cue point location, wherein said counting means has a number of outputs extending to said command signal generating means, each of said output lines having a signal frequency that is a different integral division of the tachometer signal frequency;

means responsive to said instantaneous count and to the medium velocity for selectively generating deceleration and acceleration command signals, said generating means generating a deceleration command signal in response to said velocity exceeding predetermined values at selected predetermined counts and generating an acceleration command signal when said velocity is below the predetermined values corresponding to predetermined counts, as said medium approaches said cue point location, said predetermined values successively decreasing in a stepped manner as said predetermined counts approach said cue point location;

said means for selectively generating including means for selecting one of said division frequency output signals and applying the same to means for detecting an overspeed condition, said selecting means successively applying a lesser division frequency output signal at said selected predetermined counts as the cue point location is approached; and said means for detecting an overspeed condition comprising means for measuring the period of said division frequency output signal applied thereto and providing an overspeed indication signal when said measured period exceeds a first predetermined time duration.

2. Apparatus as defined in claim 1 wherein said detecting means comprises a one-shot multivibrator having an active output for said first predetermined time duration and a D-type flip-flop with the D input being connected to said one-shot multivibrator output, said flip-flop being clocked by said selecting means selected output.

3. Apparatus as defined in claim 2 wherein said detecting means further includes means for changing said measured period to a second predetermined time duration that is longer than said first predetermined time duration.

4. Apparatus as defined in claim 3 wherein said means for changing includes hysteresis means for increasing the time constant of said one-shot multivibrator when said flip-flop provides said overspeed indication signal.

5. Apparatus as defined in claim 4 wherein said hysteresis means includes a first and a second resistor connected to said one-shot multivibrator and to a capacitor, the resistors and capacitor defining the RC time constant for said one-shot multivibrator, one of said resistors being connected to a transistor, the conduction of which is controlled by the operation of said flip-flop, said resistors being effectively connected in parallel during conduction of said transistor in response to said flip-flop not providing said overspeed indication signal and one of said resistors being effectively removed when said transistor is nonconducting in response to said flip-flop providing said overspeed indication signal, thereby increasing the RC time constant of said one-shot multivrator.

6. Apparatus as defined in claim 1 wherein said selecting means comprises a priority encoder having input control lines connected to said counting means and adapted to select one of said counting means division frequency outputs and applying the same to said selecting means output at various counts.

7. Apparatus as defined in claim 1 including means for resetting said counting means to zero, said zero count identifying said cue point location.

8. Apparatus as defined in claim 1 wherein there are about six of said selected predetermined counts and six different predetermined values.

9. Apparatus for controlling the velocity of a record medium transport mechanism to stop the medium at a predetermined cue point by selectively applying acceleration and deceleration command signals to said transport mechanism, comprising:

tachometer means for generating electrical pulses in response to movement of said medium, each pulse representing movement of an incremental distance;

means for counting said pulses, said counting means being capable of up and down counting, the instantaneous count representing the total distance and medium is from said cue point, said counting means providing a group of outputs, each output of which has an output signal with a signal frequency rate that is a different integral division of said tachometer pulse rate;

means for selecting one of said divided outputs, the output being determined by the instantaneous count, the division rate selected being successively smaller at selected predetermined counts as said count approaches the count corresponding to said cue point;

means responsive to said selecting means for measuring the period of said selected divided output signal and generating a deceleration command signal when said measured period exceeds a predetermined value and generating an acceleration command signal when said measured period is less than the value.

10. Apparatus as defined in claim 9 including means for resetting said counting means to zero, said zero count identifying said cue point location.

11. Apparatus as defined in claim 9 wherein said detecting means comprises a one-shot multivibrator having an active output for said first predetermined time duration and a D-type flip-flop with the D input being connected to said one-shot multivibrator output, said one-shot multivibrator and said flip-flop being clocked by said selecting means selected output.

12. Apparatus as defined in claim 11 wherein said detecting means further includes means for changing said measured period to a second predetermined time duration that is longer than said first predetermined time duration.

13. Apparatus as defined in claim 12 wherein said means for changing includes hysteresis means for increasing the time constant of said one-shot multivibrator when said flip-flop provides said overspeed indication signal.

14. Apparatus as defined in claim 13 wherein said hysteresis means includes a first and a second resistor connected to said one-shot multivibrator and to a capacitor, the resistors and capacitor defining the RC time constant for said one-shot multivibrator, one of said resistors being connected to a transistor, the conduction of which is controlled by the operation of said flip-flop, said resistors being effectively connected in parallel during conduction of said transistor in response to said flip-flop not providing said overspeed indication signal and one of said resistors being effectively removed when said transistor is nonconducting in response to said flip-flop providing said overspeed indication signal, thereby increasing the RC time constant of said one-shot multivibrator.

* * * * *